Oct. 4, 1949.  W. S. MARTIN  2,483,918
SLUDGE AND REFUSE DISPOSAL
Filed Oct. 15, 1946  4 Sheets-Sheet 1
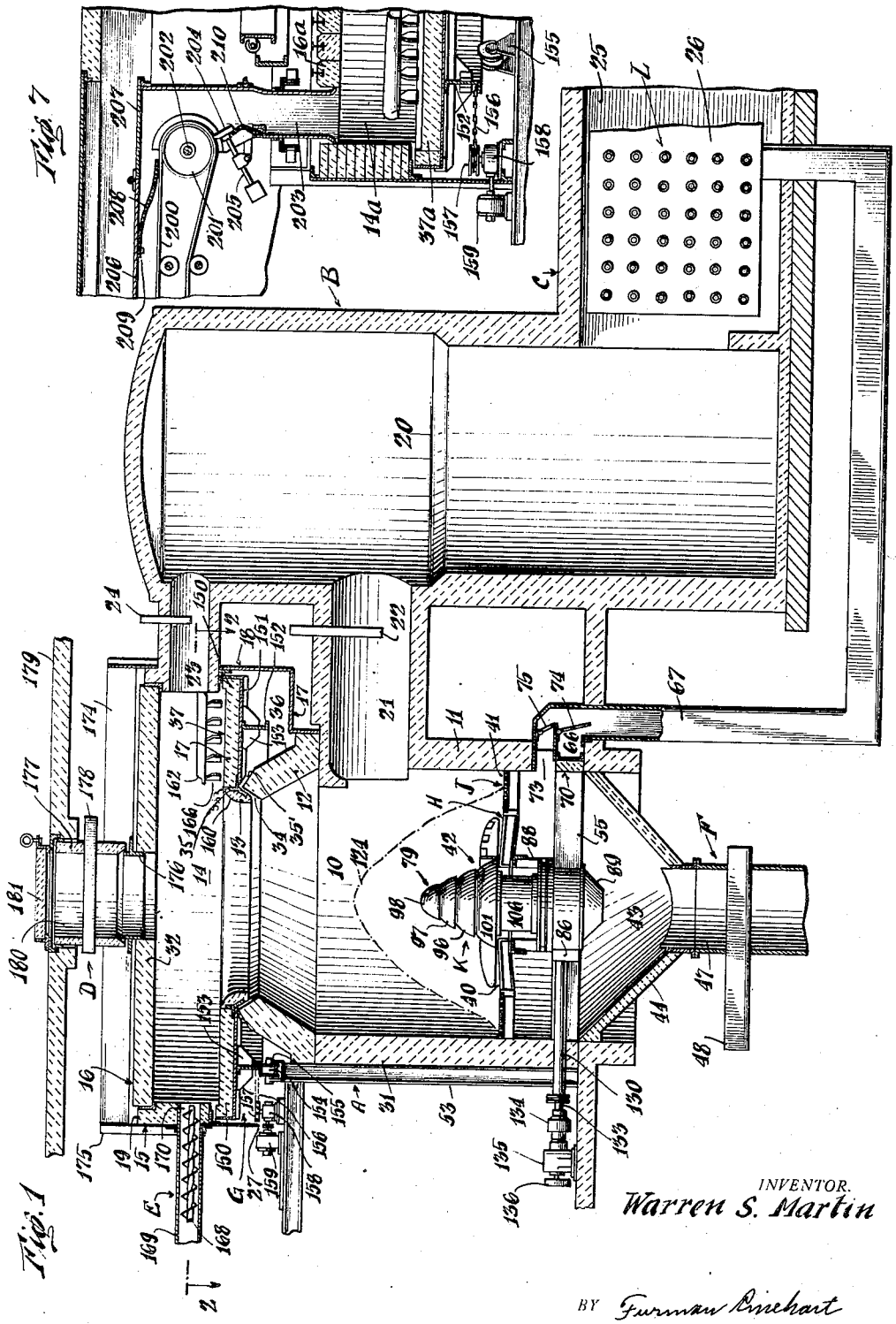
INVENTOR.
Warren S. Martin
BY Furman Rinehart
ATTORNEY

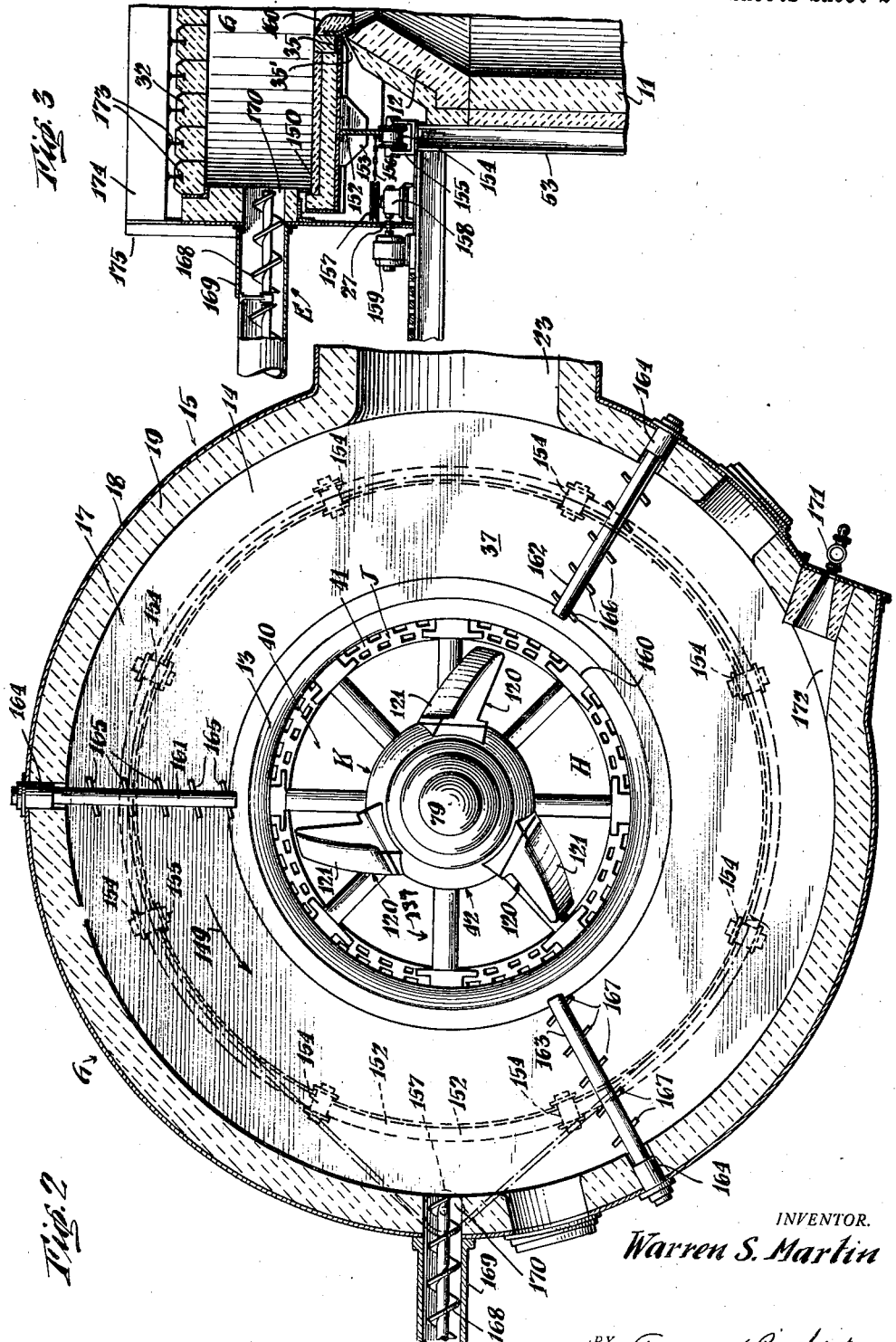

Oct. 4, 1949.                W. S. MARTIN                 2,483,918
                        SLUDGE AND REFUSE DISPOSAL
Filed Oct. 15, 1946                                  4 Sheets-Sheet 3
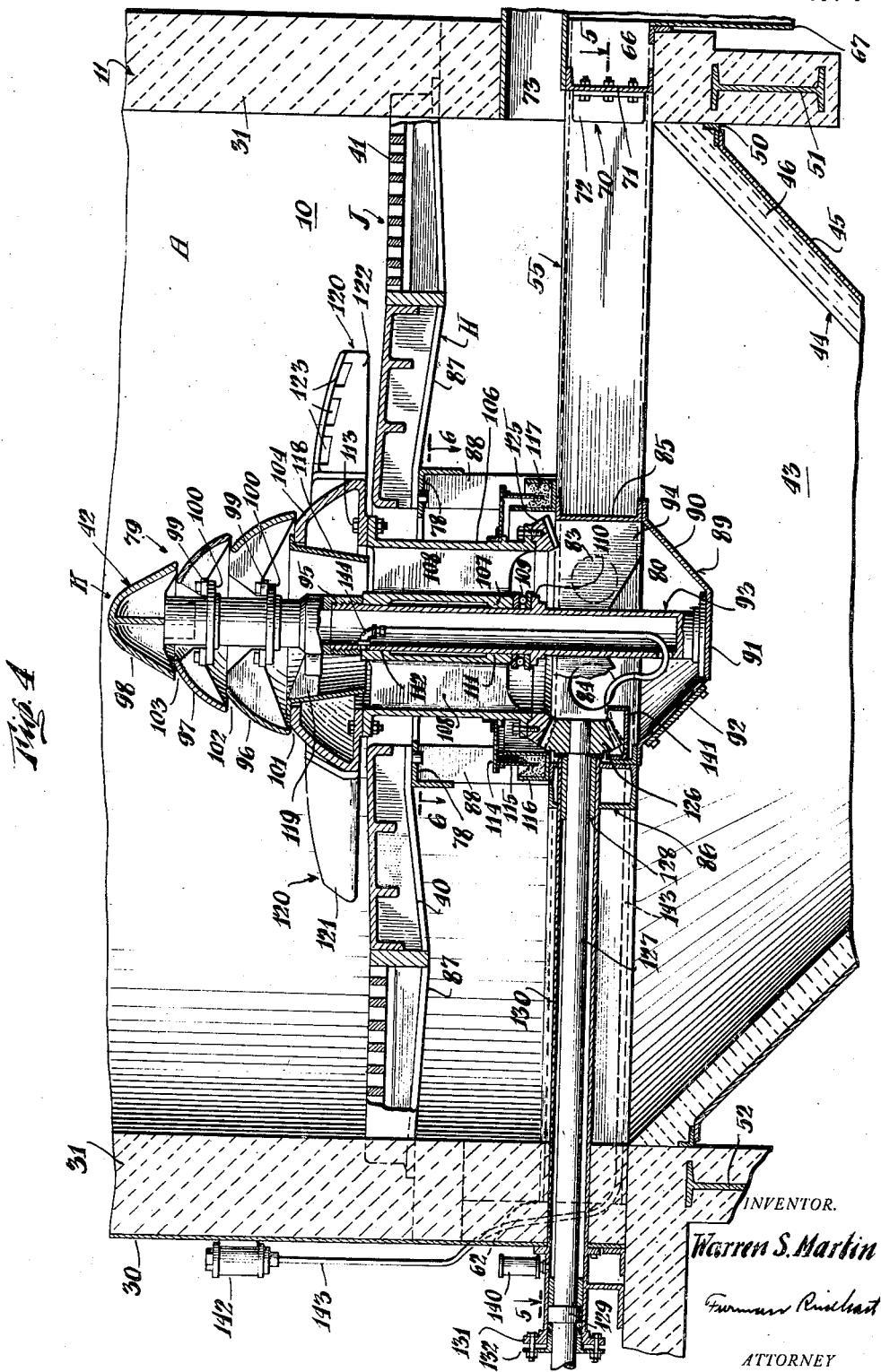
INVENTOR.
Warren S. Martin
ATTORNEY Oct. 4, 1949.   W. S. MARTIN   2,483,918
SLUDGE AND REFUSE DISPOSAL
Filed Oct. 15, 1946   4 Sheets-Sheet 4
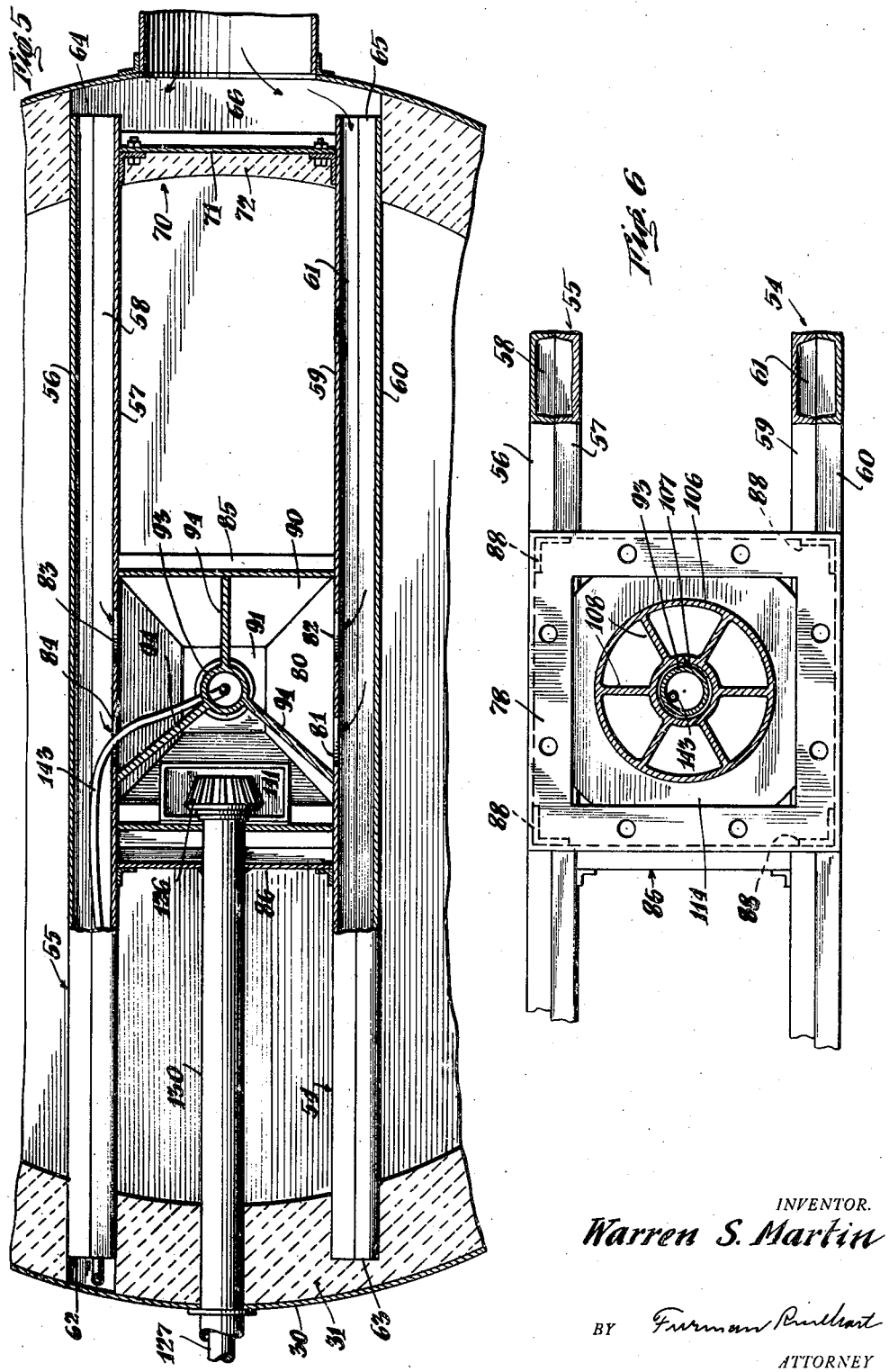
INVENTOR.
Warren S. Martin
BY Furman Rinehart
ATTORNEY Patented Oct. 4, 1949

2,483,918

UNITED STATES PATENT OFFICE 2,483,918

SLUDGE AND REFUSE DISPOSAL

Warren S. Martin, Massapequa, N. Y., assignor to Morse Boulger Destructor Company, New York, N. Y., a corporation of Delaware Application October 15, 1946, Serial No. 703,430

13 Claims. (Cl. 110—8)

1

This invention relates to the disposal of sewage sludge, refuse, rubbish, garbage and other like waste material capable of being incinerated.

It is an object of the invention to provide apparatus in which rubbish including garbage or sewage sludge may be economically incinerated and the apparatus is such that either or both may be disposed of in the same furnace.

Sewage sludge consists of the residue which remains after the treatment of sewage by septic tanks, bar screens and mesh screens, by plain sedimentation or by other treatment. Even though filtered, it still contains substantial amounts of water. In this condition it is not combustible but it can be further dried by the application of heat and sufficiently desiccated so that it may be burned. Moreover, there is inherently contained in the sludge combustible organic matter having calorific value. Various suggestions have been made for drying and burning the sludge but most of these suggestions have not resulted in sufficiently efficient disposal to warrant their use.

In those communities where there is sufficient sewage to warrant the installation of plants to treat the sewage for final disposal, there is also available other waste material, which must be disposed of, consisting of rubbish such as waste paper, garbage and other cast off waste material.

It is an object of my invention to provide an apparatus of novel construction wherein a single furnace may be utilized to dry and then burn sewage sludge and also simultaneously to dry and then burn rubbish in such manner that all of the calorific value of the organic matter contained in both the sludge and the rubbish is taken advantage of whereby the final disposal of both sludge and rubbish may be accomplished in an economical and efficient manner.

According to one embodiment of my invention I provide a furnace having a cylindrical charge drying and burning chamber having in its upper zone a rotatable annular hearth onto which sludge is charged and given a preliminary drying and having in its lower zone an annular hearth having associated therewith a mechanically driven rotatable stoker and a grate. Rubbish is charged into the lower zone, dried and burned there along with the sludge which has been previously dried in the upper zone. The dried or partially dried sludge is automatically moved from the sludge drying hearth into the rubbish burning zone. A combustion chamber connects with both the upper and lower zones of the fur-

2 nace. The combustion chamber insures complete combustion of combustible fumes and gases and the hot combustion gases pass to a chimney. In their travel to the chimney the hot combustion gases come in contact with a heat exchanger through which air passes to and through the mechanical stoker and grate to supply air for drying and burning the charge resting upon the hearth in the lower zone of the furnace.

Although the novel features which are believed to be characteristic of the invention will be pointed out in the annexed claims, the invention itself as to its objects and advantages and the manner in which it may be carried out may be better understood by reference to the following description taken in connection with the accompanying drawings forming a part hereof, in which:

Fig. 1 is a view in elevation and cross-section of a plant embodying the invention;

Fig. 2 is a plan view of the furnace on line 2—2 of Fig. 1;

Fig. 3 is a partial view in cross-section to larger scale of the sludge drying zone of the furnace showing the sludge charging device and means for driving the rotatable hearth;

Fig. 4 is a partial view in cross-section of the burning zone or firebox showing the arrangement of the mechanically driven stoker;

Fig. 5 is a partial plan view, partly in cross-section, on line 5—5 of Fig. 4;

Fig. 6 is a partial plan view partly in cross-section on line 6—6 of Fig. 4; and Fig. 7 is a view in cross-section and more or less diagrammatic of a modified form of sludge charging arrangement.

Referring to the drawings (Fig. 1), the apparatus, as shown, comprises in general a furnace A of cylindrical shape, connected to a combustion chamber B in turn connected to a breeching C. The furnace is provided with a rubbish charging hopper and chute D, a sludge charging device and port E, an ash discharge chute F, a mechanically driven rotatable annular hearth G, a stationary annular hearth H, a charge burning grate J, a mechanically driven stoker K, and a heat exchanger L. The breeching C connects with a chimney (not shown).

Referring to the drawings in further detail, the furnace has a firebox 10 having a cylindrical surrounding wall 11 the upper end of which tapers inwardly in the shape of a truncated cone 12 forming an outlet or throat 13 from the firebox 10 into the sludge drying zone 14. The sludge drying zone or chamber 14 is in effect superimposed on the firebox 10 and has a surrounding cylindrical steel casing 18. The steel casing has a side wall 15, a roof 16 and an annular bottom wall 17.

The firebox 10 connects with the combustion chamber 20 through a flue 21 having an adjustable damper 22 (shown conventionally) and the sludge drying chamber 14 connects with the combustion chamber 20 through an upper flue 23 having an adjustable damper 24 (shown conventionally). The combustion chamber 20 connects with a chimney (not shown) through a breeching 25 in which is a heat exchanger 26. It will be understood that the flues and combustion chamber are of standard construction lined with firebrick and are built according to good engineering practice.

The firebox is encased by a steel shell 30 lined with a suitable refractory 31 such as firebrick and the tapered portion 12 terminating in throat 13 is of refractory material. Also, the roof of the sludge drying chamber 14 is lined with refractory material 32 and also its cylindrical side wall is lined with refractory 19. The tapered throat portion is supported on the cylindrical side wall 11 of the firebox and its upper edge has an inverted V shape as shown at 34 which terminates short of a circular Y-shaped angle iron 35. This angle iron is secured to the rotating hearth as described hereinafter. It may be noted here, however, that the arrangement is such as to provide an annular air passageway 35' from the annular chamber 36 within the steel shell 18. Thus air may pass through the port 27 into the chamber 36 and then through the passageway 35' into the sludge drying chamber 14. This aids in preventing the underside of the rotating hearth 37 and its associated mechanism in the chamber from becoming overheated.

In the lower part of the firebox is provided a stationary annular hearth 40 surrounded by an annular grate 41 between the outer periphery of the hearth and the inner periphery of the cylindrical side wall 11. Within the firebox 10 is a mechanical stoker 42 the details of which are described hereinafter.

Below the grate 41 is an ash chamber or pit 43 which is enclosed by a wall 44 in the shape of an inverted truncated cone. It comprises a steel plate 45 lined with firebrick 46 and has a discharge chute 47 provided with a slide closure gate 48 (shown conventionally). This ash pit wall may be supported by an angle iron 50 secured to the framework supporting the furnace, it being understood that the entire apparatus is carried by a suitable steel frame. I-beams 51 and 52 and columns 53 and other steel frame members not shown, all "tied in" together according to good engineering practice, support the weight of the structure.

The stoker, designated generally by reference character 42, is supported on suitable structural steel members which are in turn supported by the side walls of the furnace. As shown in further detail in Figs. 4, 5 and 6, there is provided two main box beams 54 and 55 each of which comprises a pair of channel irons with the edges of their flanges welded together to form an air conduit. Thus, channel irons 56 and 57 are secured to each other to form the box beam 55 in which is conduit 58. Channel irons 59 and 60 form the box beam 54 and air conduit 61. The ends of these box beams are anchored in the side walls of the furnace, it being noted that the ends 62 and 63 are closed off and ends 64 and 65 are not closed off. Consequently, the conduits 58 and 61 connect with an air port 66 in the wall of the furnace. This port 66 connects in turn to an air conduit 67 from the heat exchanger 26. It is to be noted that the space in port 66 between the ends 64 and 65 of the box beams 54 and 55 is closed off by a stopper 70 comprising a steel plate frame 71 and firebrick liner 72. Above and adjacent the port 66 is an upper air port 73 connecting with the ash chamber 43 and this port also connects with air conduit 67. A damper 74 in port 66 and a damper 75 in port 73 provide means for regulating the amount of air entering the ash chamber 43 and the air conduits 58 and 61 from the main air conduit 67 leading from the air heater 26. Air passing through conduits 58 and 61 passes into the stoker air chamber 80 through apertures 81, 82, 83 and 84 in the webs of channel irons 57 and 59.

To provide a suitable framework for supporting the stoker 42 on the box beams 54 and 55 there are short cross beams secured to these beams, a channel iron 85 and a short box beam 86. The square frame comprising the beams 54, 55, 85 and 86 provides means not only to support the stoker 42 but also a suitable structural frame to support the main frame radial members 87 which hold up the hearth 40 and the grate 41. This hearth supporting frame comprises four upright angle irons 88 capped by a frame 78 made of angle irons.

Depending from the frame provided by the beams 54, 55, 85 and 86, is a pan 89 having tapering side walls 90 and flat bottom 91. This provides a closure for the bottom of the stoker air chamber 80 and it has an access door 92.

The stoker 42 is carried on a stationary hollow post 93, the lower end of which rests upon the bottom wall 91 of pan 89. This prevents sidewise movement of the post 93. The main weight, however, is borne by radial webs 94 which are secured at their inner ends to the post and at their outer ends to the frame comprising the beams 54, 55, 85, and 86. The post 93 is made in two parts. The upper part is secured to the lower part by a threaded coupling 95. The upper part of the post provides means to support a stationary "Christmas tree" tuyère head 79 which consists of a plurality of progressively smaller truncated domes 96, 97, one above another and capped with a dome cap 98. Each of these domes is open at its top and bottom and secured to the post by radial arms secured to a ring 99 in turn bolted to an annular shoulder 100 on the post. The cap 98 is removably mounted on top of the post. It will be noted that these stationary domes and cap are hollow and are spaced apart to provide annular air ports 101, 102 and 103.

Beneath the stationary tuyère head, designated generally by reference character 79, is a rotatable hollow truncated dome 104 which is supported by and rotates with a depending hollow spider sleeve. The spider sleeve comprises an outer sleeve 106 and the inner bearing sleeve 107 concentric therewith, the two sleeves being connected by radial web arms 108. The bearing sleeve 107 rotates on a thrust bearing 109, which, as shown, is of the ball bearing type. This bearing 109 is supported on an anular shoulder 110 secured to the stationary post 93. The bearing sleeve, having bearing surfaces 111 and 112, rotates about the stationary post 93.

The hollow sleeve 106 is secured at its upper end to the lower wall of the dome 104 by bolts 113.

Secured also to the hollow sleeve 106 is an annular flat ring 114 having depending from its outer periphery a cylindrical ring 115. The lower end of this ring 115 rotates in a circular channel 116 secured to the box beams. The channel 116 carries a pulverulent refractory material 117 to form an air seal. Consequently, the stoker air chamber 80 is enclosed and connects through the hollow spider sleeve 106 to the interior of the hollow rotatable dome 104 and the stationary "Christmas tree" tuyère head 79. A stationary baffle 118 secured to the post 93 by a bracket 119 provides means to adjust the relative amounts of air entering the tuyère head 79 and the rotating dome 104. This baffle is in the form of an inverted truncated cone.

Secured to and extending outwardly from the rotatable hollow dome 104 are a plurality of rearwardly curved hollow stoker arms 120, which rotate with this dome in the direction of the arrow 137. The interiors of arms 120 connect with the interior of dome 104. Each of the stoker arms has an upwardly and rearwardly inclined forward face 121 and a downwardly and rearwardly inclined trailing wall 122. The trailing wall is provided with air ports 123 through which air is supplied to a pile of charge 124 on the hearth 40.

The lower end of the sleeve 106 has bolted thereto a bevel gear ring 125 which meshes with a bevel pinion 126 fixed to the inner end of a rotatable drive shaft 127. The drive shaft 127 is mounted to rotate in bearings 128 and 129 in a casing pipe 130. This pipe 130 extends through suitable apertures in the webs of the box beam 86, it being noted that the double channel or box beam 86 provides ample strength to support the bearing 128. The outer end of the pipe 130 extends through an aperture in the steel casing 30 of the cylindrical furnace and it is provided with a flange 131 to support a hollow flanged stuffing gland sleeve 132 to provide a stuffing gland for the hollow pipe 130. The drive shaft 127 has an outer end portion 133 of reduced diameter which is connected through a clutch 134 to the drive shaft of a speed reducer 135 which is driven by suitable means such as a pulley 136 connected to be driven by a prime mover such as an electric motor (not shown).

It will be understood from the foregoing description that rotation of the drive shaft 127 through the speed reducer 135 will rotate the gear ring 125 which in turn will rotate the rotatable dome 104 with its stoker arms 120 which are secured to it. In practice the stoker dome is rotated relatively slowly—of the order of five to ten revolutions per hour.

Means are provided to lubricate the bearings of the mechanical stoker and its driving mechanism. An oil cup 140 is connected to the interior of casing pipe 130. Lubricating oil enters the pipe and will find its way to bearing 129 and bearing 128 and also to pinion gear 126. A drip pan 141 will catch oil that may drip from the pinion gear 126. Another oil cup 142 provides oil for the bearings on post 93. It is connected by a tube 143 running through the box beam 55, through the air port 84 and thence upwardly up through the hollow post 93 to a union connection 144 connecting to an oil duct to bearing 112. The lubricant will gravitate from the cup 142 and through the tube 143 and find its way to bearing 112 and then down the outside of hollow post 93 to bearings 111 and 109. The union 144 is accessible by disconnecting the threaded coupling 95.

Referring now to the upper part of the furnace (See Figs. 1, 2 and 3), there is provided a rotatable annular hearth designated generally by reference character 37. This hearth has a floor 150 of refractory material carried on a steel plate ring 151, which rests upon a circular channel iron track 152 and is reinforced by a plurality of web brackets 153. The track 152 rides in a plurality of circumferentially disposed flanged rollers 154 of which, as shown, there are eight, each mounted for rotation in a clevis or yoke 155. These roller supporting yokes are mounted so that the overlying weight is supported by a plurality of steel columns 53 circumferentially spaced around the furnace and comprising a part of the structural frame. Only one of these columns is shown in the drawings to avoid obscuring other parts.

To rotate the sludge drying hearth 37 about the vertical axis of the furnace a chain 156 is trained around the channel track 152 and driven pulley 157. Grip lugs may be secured in the channel 152 which may engage the chain 156. The pulley 157 is connected to the driven shaft of a speed reducer 158 which is in turn driven by a motor 159. As shown, the hearth rotates in the direction of arrow 149 (Fig. 2).

The inner periphery of the hearth 37 is provided with a Y-shaped circular ring which may be of a heat resisting steel and this may be protected from the intense heat rising in the throat 13 by a lip 160 of refractory bricks.

The sludge drying chamber is provided with a plurality of rabble arms. As shown there are three rabble arms 161, 162, 163 circumferentially positioned around the path of the rotatable hearth. These rabble arms are mounted in stationary fashion by anchoring their outer ends in suitable clamp holders 164 secured to the side wall of the sludge drying chamber. The rabble arms extend in a substantially radial direction toward the center of the drying chamber and each is provided with a plurality of depending flat rabble teeth or plows. It is to be noted that the rabble teeth lie adjacent the floor of the hearth 37 and teeth 165 of rabble arm 161 and the rabble teeth 167 of rabble arm 163 are at an angle to move sludge rotating with the hearth inwardly toward the center of the chamber 14, while the rabble teeth 166 on arm 162 are at an angle to push sludge rotating with the hearth outwardly toward the side wall of the chamber 14. Finally, as the sludge is dried upon the rotating hearth it is moved by the inner teeth of rabble arms 161 and 163 over the lip 160 of the rotating hearth and falls by gravity through the throat 13 of the firebox 10 onto the charge 124 so that it will be burned and disposed of there. The ashes ultimately fall through the grate 41 into the ash pit along with ashes from the burning charge of rubbish.

The sludge to be disposed of and which will ordinarily contain a large amount of water—of the order of 50% to 90%—is charged into the drying zone 14 by means of a screw conveyer 168 mounted to rotate within a charging pipe 169. The sludge is fed through a hopper (not shown) into the pipe 169 and is discharged through the charging port 170 onto the rotatable hearth 37.

The details of suspending the roof are better shown in Fig. 3. Refractory bricks 32 are hung on small I-beams 173 in turn suspended on horizontal structural steel beams 174 carried above the roof on supporting columns 175. The roof is provided with a rubbish charging port 176 connecting with a chute 177 provided with a slidable closing gate 178 (shown conventionally). The chute is mounted and carried by a rubbish charging floor 179 and the upper end constitutes a hopper 180 when the gate 178 is closed. The hopper has a cover 181 which may be opened or closed as desired for charging rubbish from the rubbish charging floor 179 into the hopper 180.

A modified form of sludge charging arrangement is shown more or less diagrammatically in Fig. 7. It has an endless belt conveyor 200 for sludge, trained over a cylindrical roll 201 mounted for rotation on an axle 202. The belt is mounted to charge sludge from the conveyor into a chute 203 which extends through the roof 16a of the sludge charging chamber 14a. A scraper 204 mounted on the end of a pivoted lever 205 will scrape the sludge from the conveyor and the sludge will fall into a charging chute 203 into the sludge drying zone onto the rotating hearth 37a. In this case, the screw conveyor and pipe are not used. The chute is substantially sealed off from the outside atmosphere by a steel plate 206 having a hinged door 207, it being noted also that there is provided a gate 208 of flexible material such as rubberized asbestos having one end 209 fastened to the plate 206 and the other free end resting on the belt and another such flexible piece 210 secured to the chute and scraper 204.

The combination sludge and rubbish disposal apparatus described in the foregoing may be operated as follows:

Rubbish which may include waste paper, or other combustible material or garbage and such other similar waste having combustible matter in it, is charged to the hopper 180 and the charge gate 178 is opened to form a pile of charge on the hearth 40 in the firebox. The stuff is set on fire and the furnace "warmed up" and this may be further aided by burning auxiliary fuel in the burner 171. When the operation gets under way, the stoker 42 is put into operation, and air is drawn through the heat exchanger 26 to preheat it. Air is drawn or otherwise forced through conduit 67. Part of it is directed into the ash pit or grate air chamber 43 and passes up through the grate 41 to aid the combustion of the rubbish and charge 124 which is moved outwardly from the pile by the rotating stoker arms 120. Another part of the air, depending upon the adjustment of dampers 74 and 75, is passed through conduits 58 and 61, thence through ports 81, 82, 83 and 84 into stoker air chamber 80. This preheated air then passes up through spider sleeve 106 where it is again divided. One part of this air flows through the rotating stoker dome 104 thence through the stoker arms 120 through air ports 123 into the pile of charge. This air aids combustion and also serves to dry out any moisture in the pile of charge 124. The other part flows up into the "Christmas tree" tuyère head and out the annular air ports 101, 102, 103 into the pile of charge, further to dry it out and air combustion.

In the meantime sludge or sludge cake is charged into the sludge drying zone through port 179 by the screw conveyor, and falls onto the floor 150 of the rotating sludge hearth 37 which is rotated by means of the motor 159 and its associated mechanism, hereinbefore described. Flame from the burner 171 sweeps around the floor of the hearth and dries out the sludge, the sludge being agitated by the rabble teeth. The hearth rotates in the direction of arrow 149 (see Fig. 2) and rabble teeth 167 and 165 move the sludge inwardly toward the center and teeth 166 move it outwardly. Finally the dried sludge is gradually moved inwardly over the lip 160 of the rotating hearth into the throat 13 of the firebox 10 where the dried sludge falls by gravity onto the charge 124. Here it is combined with the rubbish and the combined charge is ultimately completely burned to ashes. It is to be understood that as the outer edge of the pile of charge of rubbish and dried sludge is moved gradually out onto the grate 41 it is completely consumed there. The ashes fall through the grate into ash pit 43 and may be removed from time to time through the discharge gate 48 in the ash discharge chute 47.

Once the furnace gets under way the firebox is kept charged with rubbish and with sludge to utilize as little as possible of auxiliary heat supplied by fuel burned in burner 171. In cases where there is sufficient combustible in the charge the intense heat rising through the throat may be sufficient to handle the sludge without auxiliary fuel. And it is particularly significant to note also that by reason of the open throat 13 and the intense heat from the flame in firebox 10, there will be a large amount of radiant heat thrown from the firebox upon the refractory 32 of the roof of the sludge drying chamber 14. In turn this hot roof surface heated in part by radiant heat from the firebox 10 will cause radiant heat to be directed on to the rotating hearth 37. This greatly adds to the efficiency of the apparatus.

Inasmuch as the chimney provides a draft, air may be drawn from the atmosphere through the port 27 in steel casing 18 into annular chamber 36, thence through the annular passageway 35' into sludge drying chamber 14. Air so drawn in will cool the undercarriage mechanism of the sludge hearth 37.

Such combustible gases as are distilled off and not consumed in the firebox or sludge drying zone are ultimately burned in the combustion chamber 20. The hot combustion gases from the combustion chamber pass through the breeching 25 in contact with the air flowing through the heat exchanger 26 to preheat the air passing to the furnace. If the chimney does not provide sufficient draft, air may be forced through the heat exchanger by a blower (not shown). The gases then flow up the chimney (not shown). Obnoxious odors are eliminated by reason of the complete combustion of all combustible material. Accordingly, the plant will not cause an odor nuisance in the vicinity where it is installed.

Moreover, the plant is particularly advantageous when considered from the point of view of over-all economy because one furnace is sufficient to dispose of sewage sludge alone or rubbish alone or both; thus eliminating the necessity of a separate installation for each which may otherwise be necessary. Furthermore, the plant is sufficiently flexible that both sludge and rubbish can be disposed of with a minimum expense for labor and auxiliary fuel.

It will be understood also that the furnace and the combustion chamber are provided with access doors usually installed in structures of this kind. These have not been shown in detail in the drawings lest they confuse more important parts. Those skilled in the art, however, will readily understand the installation of such access doors.

While a specific embodiment of the invention has been described herein for purposes of illustration, it will be understood that modifications and changes may be made without departing from the spirit and scope of the invention comprehended by the annexed claims.

What is claimed is:

1. An incinerator furnace for disposal of sewage sludge, rubbish and the like which comprises a firebox, a stationary annular hearth in the lower part of the firebox, a grate surrounding said hearth, an ash chamber beneath said grate, a mechanically driven rotatable stoker adjacent said hearth, means defining an opening at the upper end of said firebox providing a throat, a sludge drying chamber above said firebox, an annular hearth mounted for rotation in said chamber and having a central opening registering with said throat, means including a conveyor to charge sewage sludge to said rotatable hearth, means including a chute to charge rubbish onto said stationary hearth and rabble means to move sludge on said rotatable hearth into said central opening to cause the sludge to fall into said firebox, a combustion chamber having flue connection to said firebox and sludge drying chamber, and means to supply air to said firebox.

2. An incinerator furnace for disposal of sewage sludge, rubbish and the like which comprises a firebox, a stationary annular hearth in the lower part of the firebox, a grate surrounding said hearth, an ash chamber beneath said grate, a mechanically driven rotatable stoker adjacent said hearth, a truncated cone of refractory material open at top and bottom at the upper end of said firebox providing a throat, a sludge drying chamber above said firebox, an annular sludge drying hearth mounted for rotation in said chamber and having a central opening registering with said throat, mechanism to rotate said sludge drying hearth, means including a conveyor to charge sewage sludge to said rotatable sludge drying hearth, means including a chute connected with a port in the roof of said sludge drying chamber to charge rubbish onto said stationary hearth and rabble means to move sludge on said rotatable hearth into said central opening to cause the sludge to fall into said firebox, a combustion chamber having flue connection to said firebox and sludge drying chamber, and means including a heat exchanger and conduits to supply air to said firebox, through said stoker and said grate.

3. An incinerator furnace for disposal of sewage sludge, rubbish and the like which comprises a firebox, a stationary annular hearth in the lower part of the firebox, a grate surrounding said hearth, an ash chamber beneath said grate, a mechanically driven rotatable stoker adjacent said hearth, a refractory wall defining an opening at the upper end of said firebox providing a throat, a sludge drying chamber above said firebox, an annular sludge drying hearth mounted for rotation in said chamber and having a central opening registering with said throat, means including a circular track riding on rollers for rotating said sludge drying hearth, means including a conveyor to charge sewage sludge to said rotatable hearth, means including a chute mounted above the roof of said sludge drying chamber to charge rubbish through said central opening and throat onto the stationary hearth in said firebox, stationary rabble arms mounted in said sludge drying chamber, rabble teeth on said arms to agitate sludge on said rotatable hearth and to urge the sludge from said rotatable hearth into said central opening, a burner to supply heat to sludge on said rotatable hearth, a combustion chamber, flue connection between said combustion chamber, firebox and sludge drying chamber, and means to supply air to said firebox.

4. An incinerator furnace for disposal of sewage sludge, rubbish and the like which comprises a cylindrical firebox, a stationary annular hearth in the lower part of the firebox, an annular grate surrounding said hearth, an ash chamber beneath said grate, a mechanically driven rotatable stoker adjacent said hearth, a refractory wall defining an opening at the upper end of said firebox providing a throat, a sludge drying chamber above said firebox, said sludge drying chamber having a cylindrical side wall and roof, said roof having a rubbish charging port, an annular hearth mounted for rotation in said chamber and having a central opening registering with said throat providing communication between said sludge drying chamber and firebox, means including a conveyor to charge sewage sludge onto said rotatable hearth, means including a stationary openable and closable chute mounted above said roof and registering with said port through said central opening and throat, rabble arms mounted in the side walls of said sludge drying chamber, teeth mounted on said rabble arms and positioned to agitate sludge on said rotatable hearth and to urge it into said central opening and thereby cause it to fall through said throat into said firebox, means including a passageway between said rotatable hearth and said throat for the passage of air to cool the underside of said rotatable hearth, a combustion chamber having flue connection to said firebox and sludge drying chamber and means to supply air to said firebox.

5. Apparatus for incinerating sewage sludge and rubbish which comprises a firebox, a stationary hearth having a central opening within the lower part of the firebox, an annular grate adjacent the outer periphery of said stationary hearth, an ash chamber below said grate, a rotatable stoker having a rotatable shaft extending through said central opening and stoker arms extending outwardly to sweep over said stationary hearth, means defining an opening in the upper end of said firebox providing a throat, a sludge drying chamber above said firebox and connecting therewith, an annular hearth having a central opening in registry with said throat and mounted for rotation within said sludge drying chamber, means including a conveyor to charge sludge onto said rotatable hearth, rabble arms having rabble teeth in said sludge drying chamber mounted above said rotatable hearth to urge sludge on said rotatable hearth into its said central opening and thereby cause the sludge to fall into said firebox, a rubbish charging port above the central opening of said rotatable hearth, a combustion chamber connected to said firebox and to said sludge drying chamber, and means including conduits to supply air to said firebox through said stoker and through said grate.

6. Apparatus for incinerating sewage sludge and rubbish which comprises a firebox, a stationary hearth having a central opening within the lower part of the firebox, an annular grate adjacent the outer periphery of said stationary hearth, an ash chamber below said grate, a rotatable stoker having a rotatable hollow shaft extending through said central opening and arms extending outwardly to sweep over said stationary hearth, a bevel ring gear secured to the lower end of said hollow shaft, a pinion meshing with said ring gear, a drive shaft secured to said pinion, a closure pipe for said shaft mounting bearings for said shaft, said shaft serving as a conduit for lubricant to lubricate said bearings and pinion, means defining an opening at the upper end of said firebox providing a throat, a sludge drying chamber above said firebox and connecting therewith, an annular hearth having a central opening in registry with said throat and mounted for rotation within said sludge drying chamber, means including a conveyor to charge sludge onto said rotatable hearth, rabble arms having rabble teeth in said sludge drying chamber mounted above said rotatable hearth to urge sludge on said rotatable hearth into its central opening upon rotation of the rotatable hearth and thereby cause the sludge to fall into said firebox, an openable and closable rubbish charging port above the central opening of said rotatable hearth, a combustion chamber connected to said firebox and to said sludge drying chamber, and means including conduits to supply air to said firebox through said stoker and through said grate.

7. Apparatus for incinerating sewage sludge and rubbish which comprises a firebox, a stationary hearth having a central opening within the lower part of the firebox, an annular grate adjacent the outer periphery of said stationary hearth, an ash chamber below said grate, a rotatable stoker having a rotatable shaft extending through said central opening, and arms extending outwardly to sweep over said stationary hearth, means defining an opening at the upper end of said firebox providing a throat, a sludge drying chamber above said firebox and connecting therewith, an annular hearth having a central opening in registry with said throat and mounted for rotation within said sludge drying chamber, a screw conveyor to charge sludge onto said rotatable hearth, a plurality of radially disposed stationary rabble arms having rabble teeth, said arms being mounted in the side wall of said sludge drying chamber, said teeth being in the path of travel of sludge on said rotatable hearth and arranged to cause said sludge to move into the central opening of said rotatable hearth and fall into said firebox upon rotation of said rotatable hearth, an openable and closable stationary rubbish chute above said sludge drying chamber through which rubbish will fall onto said stationary hearth, a burner arranged to throw its flame over the path of travel of sludge on said rotatable hearth, a combustion chamber, flue connection between said combustion chamber, firebox and sludge drying chamber, and means to supply air to said firebox.

8. Apparatus for incinerating sewage sludge and rubbish which comprises a firebox, a stationary hearth having a central opening within the lower part of the firebox, an annular grate adjacent the outer periphery of said stationary hearth, an ash chamber below said grate, a rotatable stoker having a rotatable shaft extending through said central opening and stoker arms extending outwardly to sweep over said stationary hearth, means defining an opening at the upper end of said firebox providing a throat, a sludge drying chamber above said firebox and connecting therewith, an annular hearth having a central opening in registry with said throat and mounted for rotation within said sludge drying chamber, means including a conveyor to charge sludge onto said rotatable hearth, rabble arms having rabble teeth in said sludge drying chamber mounted above said rotatable hearth and disposed so as to urge the sludge through the central opening of the rotatable hearth to cause the sludge to fall into said firebox, an openable and closable rubbish charging port above the central opening of said rotatable hearth, a combustion chamber connected to said firebox and to said sludge drying chamber, an upper flue connecting said sludge drying chamber to said combustion chamber, and a lower flue connecting said firebox to said combustion chamber, means including conduits to supply air to said firebox through said stoker and through said grate, and a burner arranged to direct its flame in the path of travel of sludge rotating with said rotatable hearth.

9. Apparatus for incinerating sewage sludge and rubbish which comprises a firebox, a stationary hearth having a central opening within the lower part of the firebox, an annular grate adjacent the outer periphery of said stationary hearth, an ash chamber below said grate, a rotatable stoker having a rotatable shaft extending through said central opening and stoker arms extending outwardly to sweep over said stationary hearth, means defining an opening at the upper end of said firebox providing a throat, a cylindrical sludge drying chamber above said firebox and connecting therewith, a sludge drying hearth having an annular floor area in which there is a central opening in registry with said throat, said hearth being mounted for rotation within said sludge drying chamber, means including a conveyor to charge sludge onto said rotatable hearth, stationary rabble arms mounted in said sludge drying chamber having rabble teeth positioned above said rotatable floor area in the path of travel of sludge on said area and disposed so as to urge the sludge through the central opening of the rotatable hearth to cause the sludge to fall into said firebox, a burner mounted to direct its flame in the path of travel of sludge on said area, an openable and closable rubbish charging port above the central opening of said rotatable hearth, a combustion chamber, an upper flue having a damper connecting said sludge drying chamber to said combustion chamber and a lower flue having a damper connecting said firebox to said combustion chamber, and means including a preheater and conduits having adjustable dampers therein to supply air through said stoker and grate and thence through said flues.

10. An incinerator furnace for disposal of sewage sludge, rubbish and the like which comprises a firebox having a throat in its upper part, a hearth in said firebox to support a charge of material to be burned in said furnace, a grate adjacent said hearth, stoker means to stoke a charge of material on said hearth, an ash pit beneath said grate, a drying chamber above said firebox, a rotatable hearth having an annular floor within said drying chamber, means including a circular track beneath and secured to said floor, said floor having a central opening registering with said throat, a plurality of rollers supporting said floor for rotation about the axis of said central opening, driving mechanism to rotate said floor, means including a charging port through which to charge sludge to said floor, rabbling means in the path of travel of sludge on said floor to rabble said sludge and urge it into said central opening and thereby cause it to fall through said throat into said firebox, a chute to charge rubbish into said firebox, said chute being suspended independently of said furnace and located above said central opening and throat so that rubbish charged therethrough will fall into said firebox, a combustion chamber, flue connection between said combustion chamber and furnace, and means to supply air to said firebox.

11. An incinerator furnace for disposal of sewage sludge, rubbish and the like which comprises a firebox having a throat in its upper part, a hearth in said firebox to support a charge of material to be burned in said furnace, a grate adjacent said hearth, stoker means to stoke a charge of material on said hearth, an ash pit beneath said grate, a sludge drying chamber above said firebox having a roof, cylindrical side wall and annular bottom closure, a rotatable hearth in said sludge drying chamber having an annular floor, means including a circular track beneath and secured to said floor, said floor having a central opening registering with said throat, a plurality of rollers supporting said floor for rotation about the axis of said central opening, driving mechanism to rotate said floor, a screw conveyor to charge sludge to said floor, a plurality of radially mounted stationary rabble arms in said sludge drying chamber, rabble teeth secured to said arms in the path of travel of sludge on said floor to rabble said sludge and urge it into said central opening and thereby cause it to fall through said throat into said firebox, means defining a rubbish charging port in said roof, a chute to charge rubbish into said firebox, said chute being suspended independently of said furnace and located above and in line with said charging port, central opening and throat so that rubbish charged therethrough will fall into said firebox, a passageway between the underside of said rotatable hearth and said throat for the passage of air from the atmosphere into said chamber to cool the underside of said rotatable hearth and its associated parts, a combustion chamber, flue connection between said combustion chamber and furnace, and means to supply air to said firebox.

12. An incinerator furnace for disposal of sewage sludge, rubbish and the like which comprises a firebox, a stationary annular hearth in the lower part of the firebox, a grate surrounding said hearth, an ash chamber beneath said grate, a mechanically driven rotatable stoker adjacent said hearth, means defining an opening at the upper end of said firebox providing a throat, a sludge drying chamber above said firebox, an annular hearth mounted for rotation in said chamber and having a central opening registering with said throat, said chamber having a roof of refractory material overlying said rotatable hearth, means including a conveyor to charge sewage sludge to said rotatable hearth, means including a chute to charge rubbish onto said stationary hearth and rabble means to move sludge on said rotatable hearth into said central opening to cause the sludge to fall into said firebox, a combustion chamber having flue connection to said firebox and sludge drying chamber, and means to supply air to said firebox, said throat permitting radiant heat from material burning in the firebox to pass through said throat to said refractory roof from which roof radiant heat passes to said rotatable hearth.

13. An incinerator furnace for disposal of sewage sludge, rubbish and the like which comprises a firebox, a stationary annular hearth in the lower part of the firebox on which to burn the rubbish, a grate surrounding said hearth, an ash chamber beneath said grate, stoker means to stir rubbish on said hearth, means defining an opening at the upper end of said firebox providing a throat, a sludge drying chamber above said firebox, an annular hearth mounted for rotation in said chamber and having a central opening registering with said throat, said chamber having a roof of refractory material overlying said rotatable hearth, means including a conveyor to charge sewage sludge to said rotatable hearth, means including a chute to charge rubbish onto said stationary hearth and rabble means to move sludge on said rotatable hearth into said central opening to cause the sludge to fall into said firebox, a combustion chamber having flue connection to said firebox and sludge drying chamber, and means to supply air to said firebox, said throat permitting radiant heat from material burning in the firebox to pass through said throat to said refractory roof from which roof radiant heat passes to said rotatable hearth.

WARREN S. MARTIN.

REFERENCES CITED

The following references are of record in the file of this patent:

UNITED STATES PATENTS

| Number | Name | Date |
| --- | --- | --- |
| 551,342 | Wentworth | Dec. 10, 1895 |
| 647,432 | Whedon | Apr. 10, 1900 |
| 2,171,538 | Black | Sept. 5, 1939 |

FOREIGN PATENTS

| Number | Country | Date |
| --- | --- | --- |
| 6,242 | Great Britain | Apr. 12, 1889 |
| 269,331 | Italy | Nov. 16, 1929 |